(12) United States Patent
Srebrnik et al.

(10) Patent No.: US 12,204,933 B2
(45) Date of Patent: Jan. 21, 2025

(54) ASYNCHRONOUS STATISTIC-BASED RATE LIMITING IN DISTRIBUTED SYSTEM

(71) Applicant: Stripe, Inc., San Francisco, CA (US)

(72) Inventors: Yoav Srebrnik, Seattle, WA (US); Brandon Farrell, Seattle, WA (US); Davin Bogan, Lafayette, CA (US)

(73) Assignee: STRIPE, INC., San Francisco, CA (US)

( * ) Notice: Subject to any disclaimer, the term of this patent is extended or adjusted under 35 U.S.C. 154(b) by 770 days.

(21) Appl. No.: 17/390,270

(22) Filed: Jul. 30, 2021

(65) Prior Publication Data

US 2023/0034770 A1 Feb. 2, 2023

(51) Int. Cl.
*G06F 9/48* (2006.01)
*G06N 20/00* (2019.01)

(52) U.S. Cl.
CPC .............. *G06F 9/485* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,339,784 B1* | 1/2002 | Morris | ................ | G06F 21/6218 709/224 |
| 7,764,615 B2* | 7/2010 | Gilfix | ..................... | H04L 67/61 370/408 |
| 7,908,363 B2* | 3/2011 | Kothari | .................. | G06F 21/10 709/224 |
| 8,320,240 B2* | 11/2012 | Kwan | ................. | H04L 47/6255 370/395.42 |
| 8,819,252 B1* | 8/2014 | Szeto | .................. | H04L 63/1458 709/227 |
| 9,306,994 B2* | 4/2016 | Gahm | ................ | H04N 21/6125 |
| 9,374,289 B2* | 6/2016 | Kotecha | ............. | H04L 43/0882 |
| 9,497,139 B2* | 11/2016 | Klein | ..................... | H04L 47/828 |
| 9,521,177 B2* | 12/2016 | Gahm | ..................... | H04L 47/11 |
| 10,084,800 B2* | 9/2018 | Bergman | ............ | H04L 63/1416 |
| 10,191,686 B2* | 1/2019 | Chrysanthakopoulos | .................... | G06F 9/541 |
| 10,554,564 B2* | 2/2020 | Murphy | .................. | H04L 47/25 |
| 10,587,524 B2* | 3/2020 | Byelov | .................... | H04L 47/25 |
| 10,951,532 B2* | 3/2021 | Chen | ........................ | H04L 49/90 |
| 11,824,782 B2* | 11/2023 | Harp | ..................... | G06F 16/252 |
| 2009/0304020 A1* | 12/2009 | Bodin | ..................... | H04L 47/15 370/458 |
| 2018/0248807 A1* | 8/2018 | Murphy | .................. | H04L 67/53 |
| 2018/0309686 A1* | 10/2018 | Roth | ........................ | H04L 47/25 |
| 2020/0028788 A1* | 1/2020 | Chen | ...................... | H04L 47/215 |
| 2021/0234890 A1* | 7/2021 | Bansal | ................ | H04L 63/0227 |

* cited by examiner

*Primary Examiner* — Van H Nguyen
(74) *Attorney, Agent, or Firm* — Foley & Lardner LLP

(57) ABSTRACT

In an example embodiment, rate limiting is performed at the instance level (i.e., locally), but utilizing throughput statistics of other instances. These statistics may be measured locally by each instance and then transmitted to a central store, where they are aggregated. Each instance is then able to asynchronously request the aggregated statistics from the central store and use this information to manage the parameters of its own local rate limiter.

15 Claims, 7 Drawing Sheets

ASYNCHRONOUS STATISTIC-BASED RATE LIMITING IN DISTRIBUTED SYSTEM

TECHNICAL FIELD

The subject matter disclosed herein generally relates to distributed architectures. More particularly, the subject matter disclosed herein relates to an asynchronous statistic-based approach to rate limiting in distributed architectures.

BACKGROUND

In computing, a distributed system is one in which resources of a single service are distributed across multiple computing nodes. Typically, the nodes each run an instance of software designed for the service. The resources are then considered to be shared across the instances.

Rate limiting, where the number of requests per time period is limited in some fashion, is generally put into place in distributed systems as a defensive measure. Shared services need to protect themselves from excessive use—whether intended or unintended—to maintain service availability. Even highly scalable systems have limits on consumption at some level.

Typically rate limiting is implemented in one of several ways. A rate limiter may be established centrally (such as in the cloud), with some sort of central rate limit set at a number of requests that can be handled by the resource simultaneously, and each instance checks the central rate limiter prior to sending each request to determine whether the rate limiter will allow it (i.e., to see if the upper limit of simultaneous requests is already being handled). This solution suffers from technical limitations, however, in that it requires a call between the local instance and the central rate handler prior to each request being sent, which uses network bandwidth and slows performance. A variation of this is to have a rate limiter at each instance that checks a centralized cache (or "bucket") of requests to determine whether the capacity of the cache (or bucket) has been reached, but again this requires a call be made over the network prior to each request being sent.

Another solution would be to do away with the centralized cache or rate limiter and proceed solely with local rate limiters at each instance being assigned an equal share of overall available capacity of the resource. For example, if a resource can handle 50 simultaneous requests and there are 25 instances, each instance may be assigned a capacity limit of 2 requests, meaning that each instance's rate limiter would enforce the limit such that no more than 2 requests from the corresponding instance can be handled at the resource at the same time. Thus, if 2 requests had already been sent by an instance and neither of these requests had been satisfied by the resource yet, then a third request received by the instance would be delayed until after one of the original 2 requests had been satisfied (or alternatively, the third request could be discarded). This solution, however, suffers from the technical problem that it is unable to handle a situation where one instance may persistently generate more requests than other instances, such as an event occurring that persistently shifts requests to a single instance. In such cases, that single busy instance may wind up unnecessarily limiting the rate of requests it sends if the other instances are not generating many requests.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, rate limiting is performed at the instance level (i.e., locally), but utilizing throughput statistics of other instances. These statistics may be measured locally by each instance and then transmitted to a central store, where they are aggregated. Each instance is then able to asynchronously request the aggregated statistics from the central store and use this information to manage the parameters of its own local rate limiter.

Each instance may begin with the assumption that over the next period it will require the same capacity that it used over the previous period. Next, using the aggregated statistics from the central store, it determines how much excess capacity was available in the previous period. The instance then calculates its equal share of that excess capacity and adds it to the capacity that it has already allocated to itself.

Figure 1:
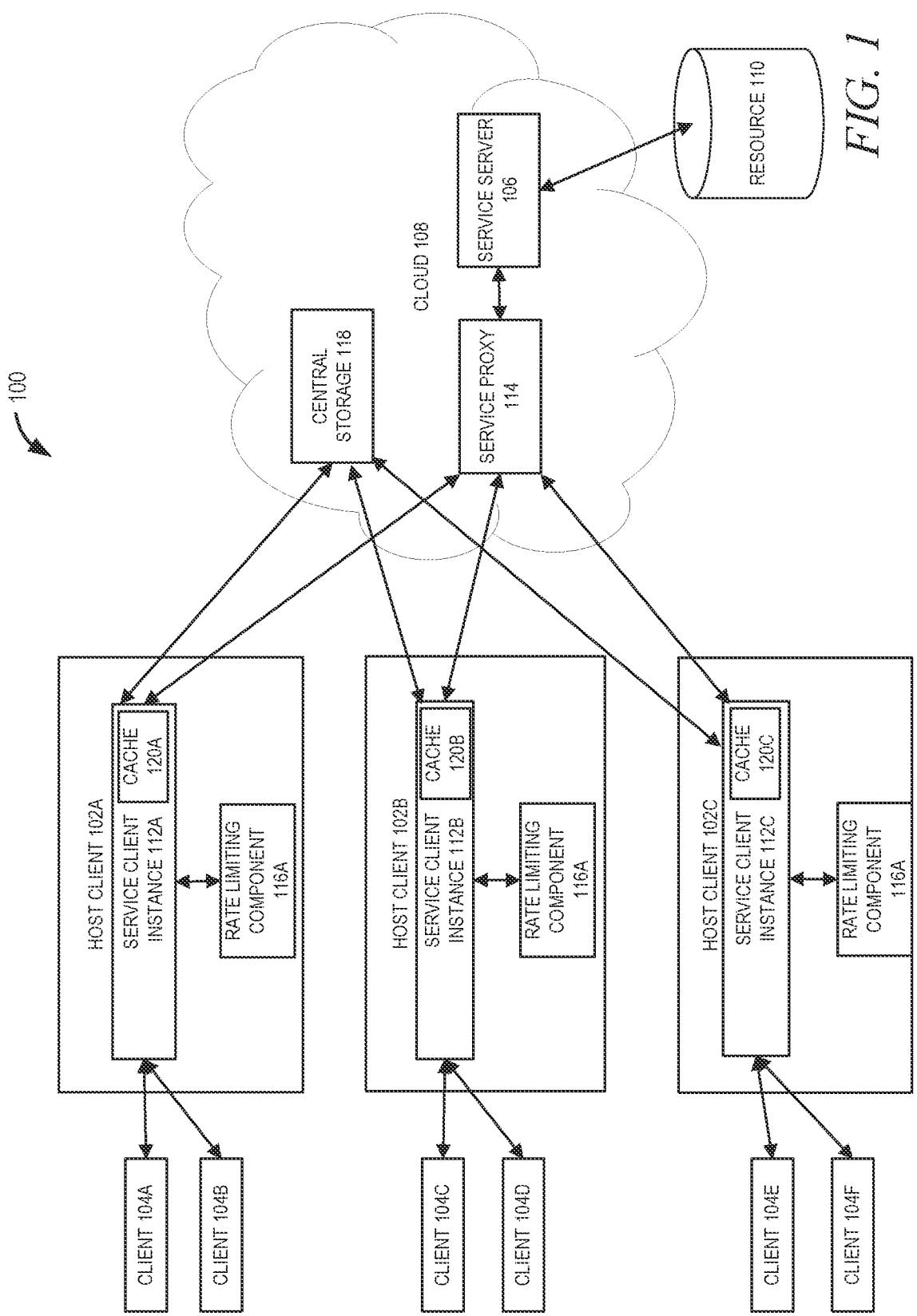
FIG. 1 is a diagram illustrating a distributed system, in accordance with an example embodiment.

FIG. 1 is a diagram illustrating a distributed system 100, in accordance with an example embodiment. A plurality of host clients 102A, 102B, 102C may make requests of a service. Each of these host clients 102A, 102B, 102C may support a number of clients 104A, 104B, 104C, 104D, 104E, 104F, which can be individual computing devices operated by users, or could be operated by entities. Each of the host clients 102A, 102B, 102C may be operated by a different entity, such as a corporation or other business or organization.

A service server 106 operating in the cloud 108 may offer shared access to the host clients 102A, 102B, 102C to a resource 110, such as a database. This is implemented by the host clients 102A, 102B, 102C each running a different service client instance 112A, 112B, 112C of a service client corresponding to the service server 106.

A service proxy 114 may provide a universal data plane for the service server 106 to abstract aspects of the service in a platform-agnostic manner. All communications between the service client instances 112A 112B, 112C and the service server 106 may flow through the service proxy 114.

As briefly described earlier, one potential approach to rate limiting would be to add a rate limiter sidecar running alongside the service proxy 114 to enforce global rate limits on requests to the service server 106. More particularly, the service proxy 114 would query the rate limiter sidecar for each received request and delay or cancel requests that caused the number of requests to exceed a rate limit. This presents a technical problem, however, in that it adds latency to each request, slowing down the entire system.

In an example embodiment, a rate limiting component 116A, 116B, 116C is added to each service client instance 112A, 112B, 112C. The rate limiting component 116A, 116B, 116C performs multiple tasks that are different from ordinary local rate limiters. First, it repeatedly measures throughput for the corresponding service client instance 112A, 112B, 112C over some time period (e.g., 5 seconds), rather than merely measuring a number of simultaneous requests from the instance being handled by the resource. Thus, rate limiting component 116A measures the number of requests generated by service client instance 112A every 5 seconds. The throughput measurements are then asynchronously sent to a central storage 118 from each rate limiting component 116A, 116B, 116C, where they are aggregated. In an example embodiment, the measurements are sent in the form of histograms.

Each rate limiting component 116A, 116B, 116C then asynchronously checks the aggregated throughput statistics in the central storage 118, and modifies one or more parameters of a localized rate limit based on these statistics. In an example embodiment, these parameters include maximum capacity and fill rate, and act as adaptive thresholds for a local rate limit for the corresponding service client instance.

The local rate limit may be based on a combination of the local throughput (i.e., the throughput for the most recent period for the corresponding service client instance 112A, 112B, 112C) and the throughput for the other service client instances 112A, 112B, 112C, as contained in the aggregated measurements. More particularly, in an example embodiment, a rate limiter for a particular instance uses the throughput for the last time period for that particular instance along with a calculation of how much excess capacity there was at the resource (based on the throughput of other service instances) in that same time period. Thus, rather than base its rate limit on an equal share of resource capacity (e.g., total number of requests that can be handled by the resource per time period divided by the total number of service client instances), it may base its rate limit on its own actual usage from the last time period and adds to that an equal share of the excess capacity from the last time period.

Since the communications between the rate limiting component 116A, 116B, 116C and the central storage 118 are performed asynchronously, they do not create a latency for each request. Indeed, requests may be sent to the service proxy 114 (or in some implementations directly to the service server 106) as they would normally be sent, as long as the local rate limit (e.g., capacity and/or fill rate) is not exceeded.

Figure 2:
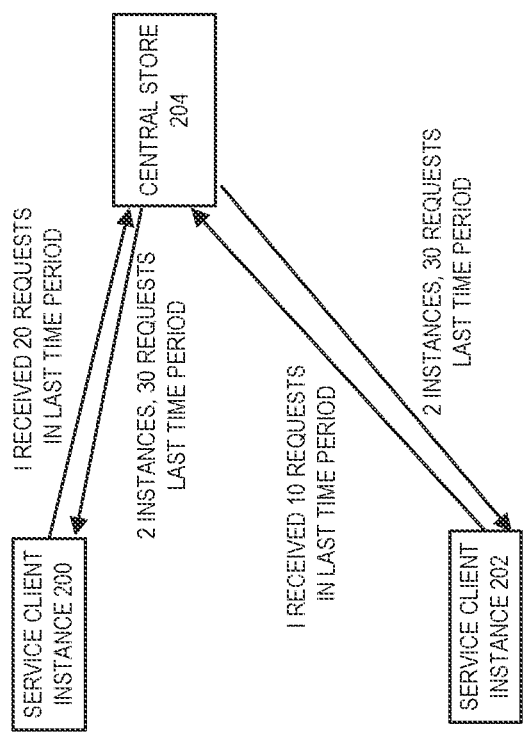
FIG. 2 is a block diagram illustrating an example of recalculation of an allocated local capacity for a local rate limiter, in accordance with an example embodiment.

FIG. 2 is a block diagram illustrating an example recalculation of an allocated local capacity for a local rate limiter, in accordance with an example embodiment. Here, service client instance 200 reports a throughput of 20 requests received in the last period, while service client instance 202 reports a throughput of 10 requests received in the last time period. Both of these reports may be aggregated and stored in central store 204. If one assumes a resource having a capacity of 40 requests per period, then during that time period (assuming, for example, it was the first time period measured), that capacity may have been equally divided among service client instance 200 and service client instance 202 (i.e., 20 requests allocated to each). Thus, during that time period, a rate limit of no more than 20 requests would have been enforced by rate limiting components on the service client instance 200 and the service client instance 202.

After asynchronous calls, service client instance 200 and service client instance 202 may receive the aggregated throughput totals (2 instances, 30 requests). Their respective local rate limiters may then recalculate their new capacities based on these aggregated throughout totals. For example, here there is an excess capacity (also known as "headroom") in the last period of 10 requests, which divided by 2 instances is 5 per instance. Thus, service client instance 200 adds the 20 requests it actually received in the last time period to this extra 5 and arrives at a new capacity for this time period of 25 requests, while service client instance 202 adds the 10 requests it actually received in the last time period to this extra 5 and arrives at a new capacity for this time period of 15 requests.

In this manner, the total overall fill rate rarely exceeds the total capacity of the resource, but each service client instance has sufficient fill rate or capacity to handle the traffic level it recently received (with a buffer in case that traffic level increases further). This solution maintains correct rate limiting even in the face of large differences in load between instances. It may throttle for a few time periods if there is a sudden dramatic shift in the local distribution, but quickly recovers once capacities adjust.

It should be noted that in some cases, the "excess capacity" may actually be negative if the resource capacity was exceeded in the last time period. In this case, the process operates the same, however, as that negative number simply causes an individual service client instance to lower its capacity or fill rate for the next time period.

Referring back to FIG. 1, each service client instance 112A, 112B, 112C may additionally maintain a cache 120A, 120B, 120C in which requests may be stored until such time that they are sent to the service proxy 114. More particularly, the service client instance 112A, 112B, 112C may check with its rate limiting component 116A, 116B, 116C to determine whether it is permissible to send a request to the service proxy 114 (i.e., if the local rate limit has not been exceeded), and then if so, it sends a request from the corresponding cache 120A, 120B, 120C to the service proxy.

In an example embodiment, one or more rate limiting algorithms may be implemented by the rate limiting component 116A, 116B, 116C. These may include, for example, a leaky bucket algorithm or a token bucket algorithm.

A leaky bucket algorithm operates by maintaining a bucket or cache of a particular size (its capacity), and limiting the rate at which requests can be removed from the bucket or cache and sent across the network (in this case, to the service proxy 114).

A token bucket algorithm operates similarly to a leaky bucket algorithm in that a bucket or cache of a particular size is maintained, but the rate/way tokens are added is different. Instead of holding the requests, the bucket or cache holds tokens, generated by a clock at a rate of one token every time period (e.g., 1 second). For a request to be transmitted, it must capture and destroy one token. This produces a different traffic shaping pattern than the leaky bucket algorithm, although the leaky bucket algorithm can be thought of as a token bucket algorithm with a continuous token add rate rather than the intervals of a pure token bucket algorithm. The leaky bucket algorithm does not allow idle hosts to save up permissions to send large bursts later, but the token bucket algorithm does allow saving, up to the maximum size of the bucket. This property means that request bursts of up to the maximum size of the bucket can be sent at once, allowing some burstiness in the output stream and giving faster response to sudden bursts of requests.

Another difference between the two algorithms is that the token bucket algorithm throws away tokens when the bucket fills up but never discards requests.

In some instances, a clock skew may create technical issues that may need to be resolved. Clock skew occurs when one or more of the service client instances have clocks not operating correctly or getting out of sync. One issue is that the rate an individual service client instance may measure may be incorrect due to an incorrect clock. For example, if a service client instance's clock runs 10% too quickly, the fill rate of its token bucket will be much faster and thus its "available capacity" will be that much greater. Another issue is that if service instance clocks get too far out of sync, the throughputs being aggregated may wind up being for out-of-sync time periods. Either of these problems may be solved by each service client instance periodically requesting a current time, or another technique to correct clocks.

In another example embodiment, machine learning techniques may be used to further refine the capacity or fill rate computed at each rate limiting component 116A, 116B, 116C. More particularly, a machine learning algorithm may use training data to learn a machine learned model to predict a modification to the capacity based on a prediction of the number of service client instances and/or the time of day. In another example embodiment, each service client instance may operate on a node that may have a node type and the node type may be used to predict a modification to the capacity, based on a machine learned model. For example, each combination of service and computing platform may be considered to be a separate node type, and each node type could potentially have a different modification or modification weight assigned to it, as predicted by a machine learned model.

The machine learned model may be stored on the service client instance 112A, 112B, 112C itself, or alternatively it could be stored elsewhere and its predictions may simply be used by the service client instance 112A, 112B, 112C.

Figure 3:
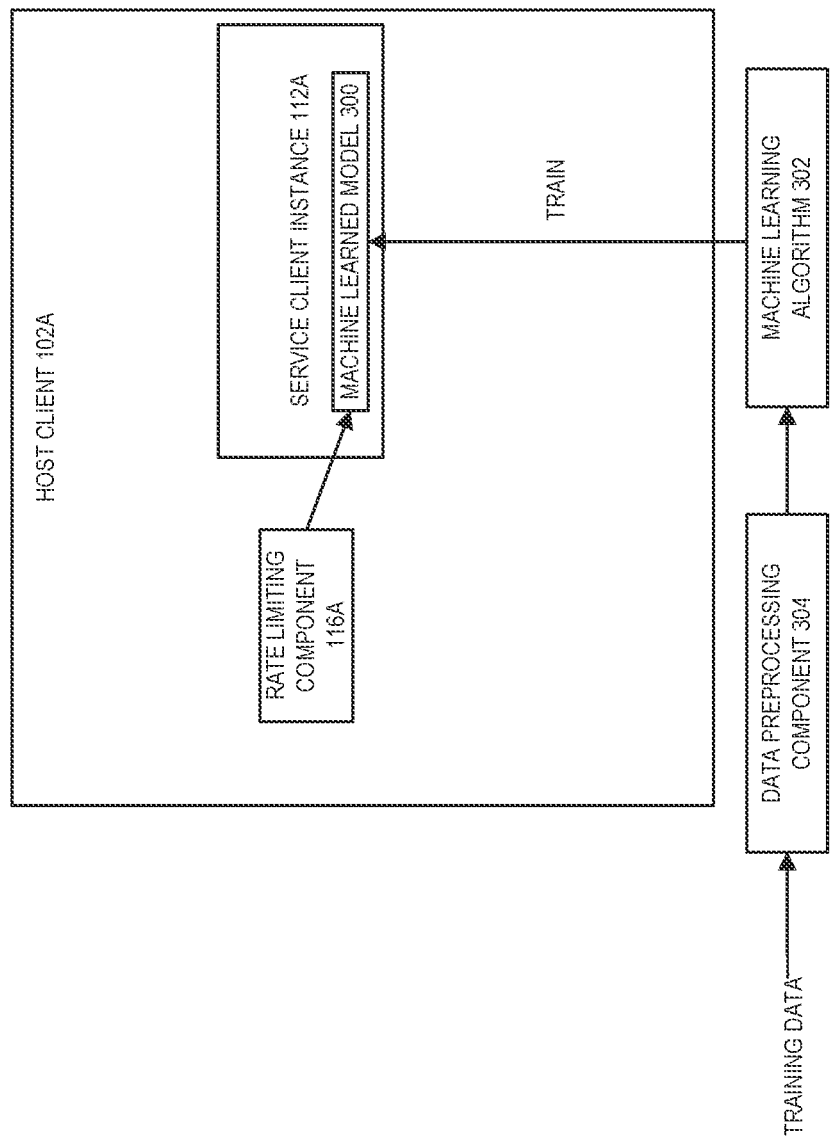
FIG. 3 is a block diagram illustrating a service client instance that includes a machine learned model, in accordance with an example embodiment.

FIG. 3 is a block diagram illustrating a host client 102A that includes a machine learned model 300, in accordance with an example embodiment. Here, rate limiting component 116A provides input information to the machine learned model 300, which returns a predicted modification of a capacity or fill rate based on the input information. The input information may include, for example, a node type for the node running the service client instance 112A and/or the time of day.

The machine learned model 300 may be trained by a machine learning algorithm 302.

Specifically, training data may be obtained from a data source (not pictured). In some example embodiments, the training data comprises previous throughput information, times of days, node types and quantities, and other statistical information.

A training data preprocessing component 304 may preprocess the training data, including, for example, applying a MapReduce function or similar functionality on the training data. The machine-learning algorithm 302 learns weights assigned to each of the features and applies these weights to a function. The function and the learned weights comprise the machine-learned model 300.

The machine-learning algorithm 302 may be selected from among many different potential supervised or unsupervised machine-learning algorithms. Examples of supervised machine-learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine-learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors). In a further example embodiment, a boosted tree gradient descent process is utilized for the machine learning.

Figure 4:
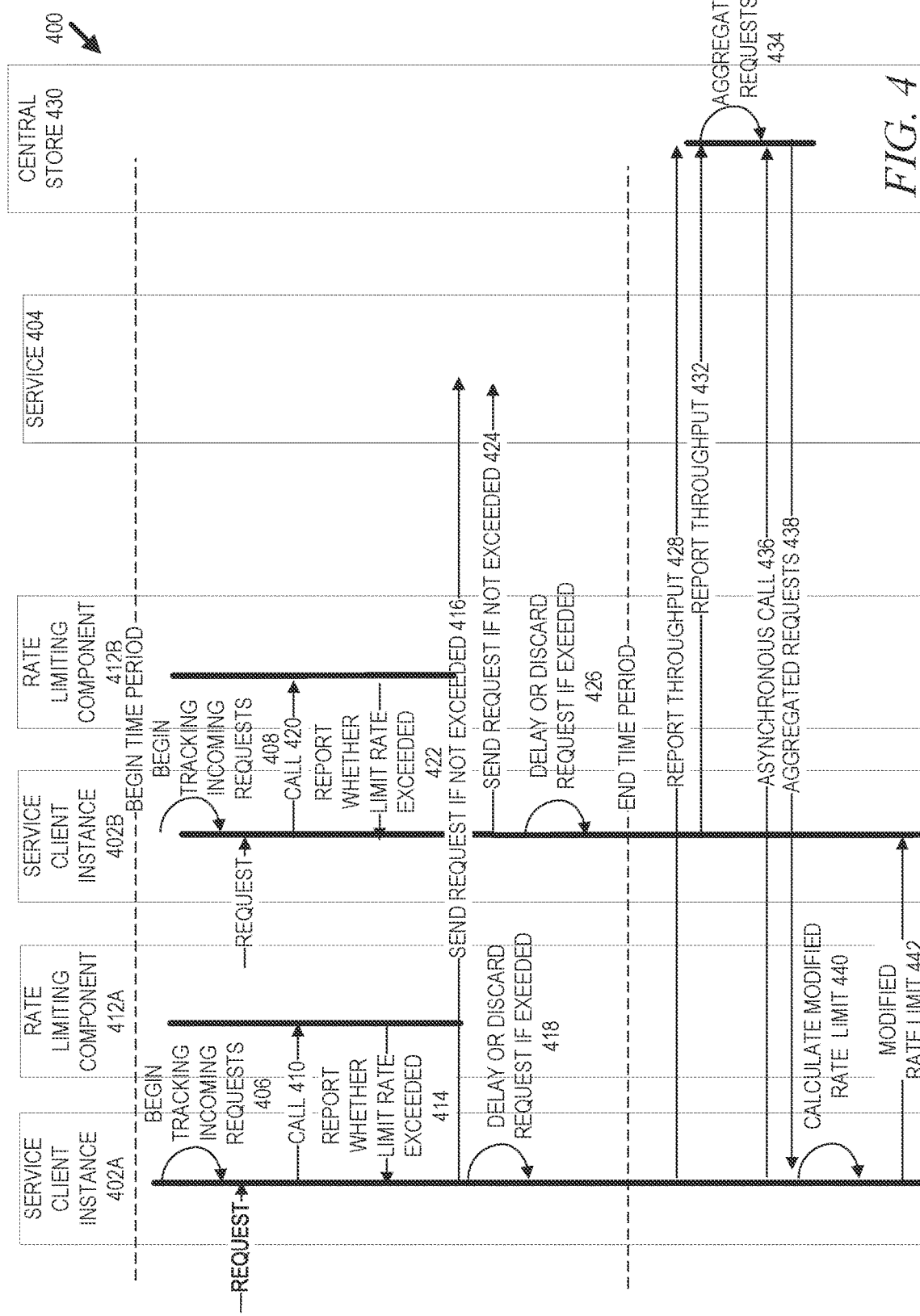
FIG. 4 is a ladder diagram illustrating a method for operating service client instances of a service, in accordance with an example embodiment.

FIG. 4 is a ladder diagram illustrating a method 400 for operating service client instances 402A, 402B of a service 404, in accordance with an example embodiment. At operation 406, service client instance 402A begins tracking incoming requests for the service during a first time period. At around the same time, at operation 408, service client instance 402B begins tracking incoming requests for the service during the first time period.

As requests come in for the service at service client instance 402A, for each request, a call 410 is made to rate limiting component 412A. Rate limiting component 412A acts to enforce a first rate limit during the first time period by informing 414 service client instance 402A as to whether or not the first rate limit has been exceeded. If not, then at operation 416 the service client instance 402A sends the request to the service 404 (perhaps via another component, such as a service proxy), to be fulfilled. If the rate limit has been exceeded, then at operation 418 the service client instance 402A either discards the request or delays sending the request. Each received request is counted during the tracking, and the receiving of the requests continue in this manner until the first time period has expired.

Likewise, as requests come in for the service at service client instance 402B, for each request, a call 420 is made to rate limiting component 412B. Rate limiting component 412B acts to enforce a first rate limit during the first time period by informing 422 service client instance 402B as to whether or not the first rate limit has been exceeded. If not, then at operation 424 the service client instance 402B sends the request to the service 404 (perhaps via another component, such as a service proxy), to be fulfilled. If the rate limit has been exceeded, then at operation 426 the service client instance 402B either discards the request or delays sending the request. Each received request is counted during the tracking, and the receiving of the requests continues in this manner until the first time period has expired.

Once the first time period has expired, service client instance 402A reports the total number of requests it received for the service during the first time period, at operation 428, to central store 430, and service client instance 402B reports the total number of requests it received for the service during the first time period, at operation 432, to central store 430. At operation 434, central store 430 aggregates the total number of requests received by all service client instances.

At operation 436, service client instance 402A makes an asynchronous call to the central store 430 to obtain the aggregated total number of requests received by all service client instances during the first time period (returned at operation 438). It may also, at this time, receive an indication of a total capacity of the service 404 (although this information may in some embodiments be reported separately, either at each time period or simply once during the beginning of the method 400).

At operation 440, service client instance 402A calculates a modified rate limit based on the total number of requests it received during the first time period, the aggregated total number of requests received by all service client instances during the first time period, and the total capacity of the service 404. At operation 442, service client instance 402A informs the rate limiting component 412A of this modified rate limit, which it then begins enforcing for a second time period. Operations 440 and 442 may be repeated on each service client instance 402A, 402B. Additionally, at each time period, the entire method 400 may be repeated, thus causing the service client instances 402A, 402B to repeatedly modify their own local rate limits based on information gathered in the prior time period.

Figure 5:
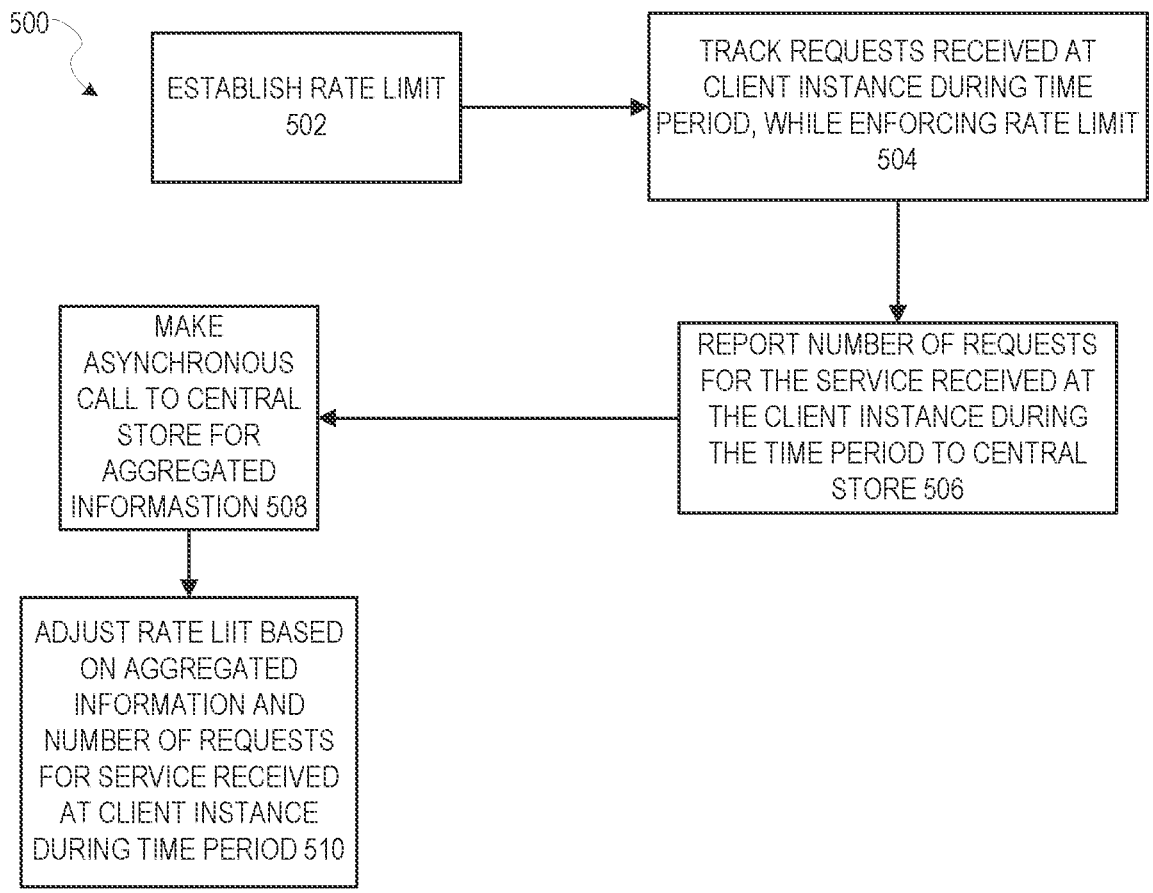
FIG. 5 is a flow diagram illustrating a method of operating a client instance of a service, in accordance with an example embodiment.

FIG. 5 is a flow diagram illustrating a method 500 of operating a client instance of a service, in accordance with an example embodiment. At operation 502, a rate limit for requests for the service received at the client instance is established. At operation 504, a number of requests for the service received at the client instance during a first time period, while enforcing the rate limit, is tracked.

At operation 506, the number of requests for the service received at the client instance during the first time period is reported to a central store. At operation 508, an asynchronous call is made to the central store for aggregated information regarding a total number of client instances of the service connected to the service during the first time period and the number of requests for the service received at all client instances of the service during the first time period. At operation 510, the rate limit is adjusted based on the total number of client instances of the service connected to the service during the first time period and the number of requests for the service received at all client instances of the service during the first time period.

Figure 6:
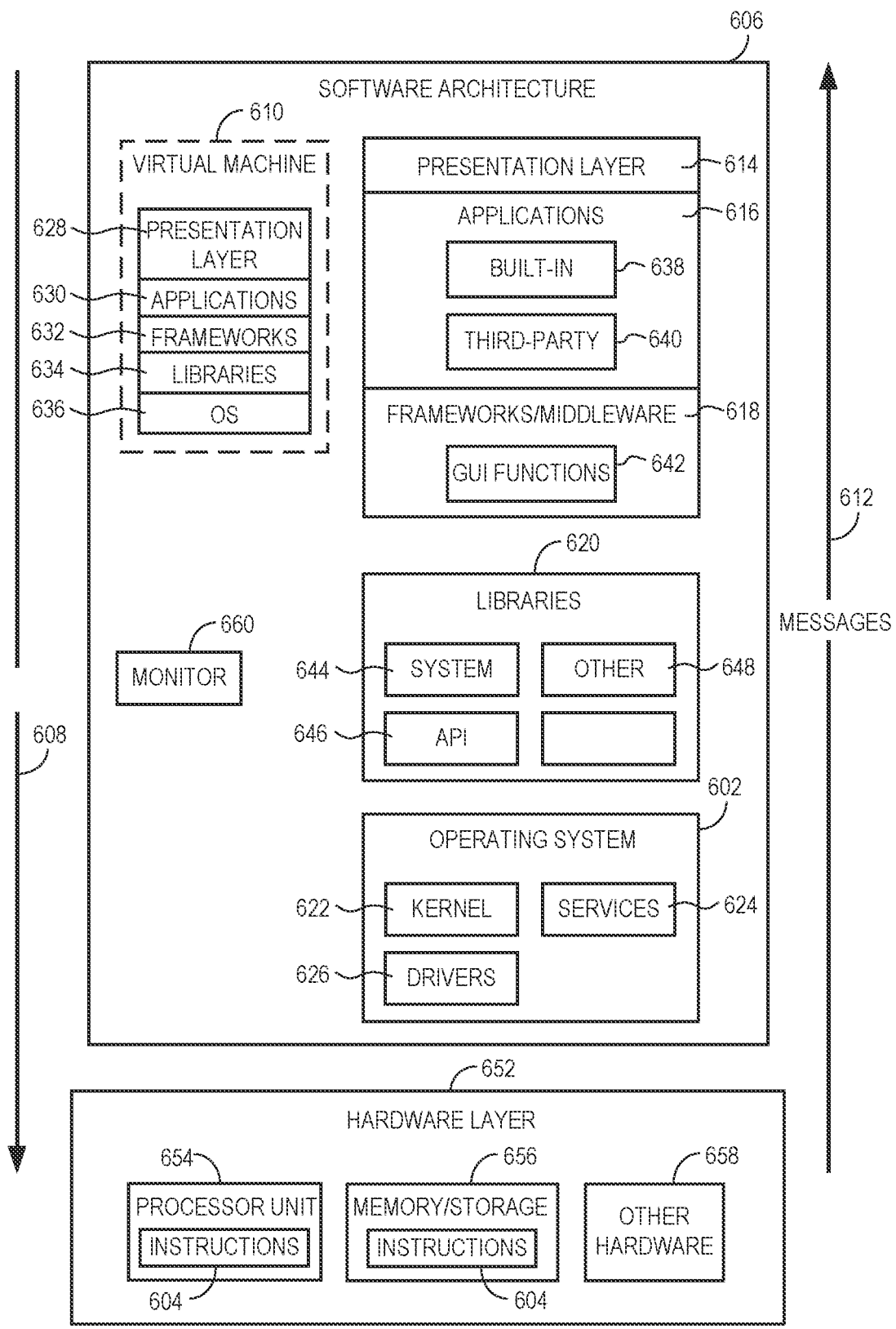
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606, and it will be appreciated that many other architectures may be implemented to facilitate the functionality described herein. The software architecture 606 may execute on hardware such as a machine 700 of FIG. 7 that includes, among other things, processors 704, memory/storage 706, and input/output (I/O) components 718. A representative hardware layer 652 is illustrated and can represent, for example, the machine 700 of FIG. 7. The representative hardware layer 652 includes a processor 654 having associated executable instructions 604. The executable instructions 604 represent the executable instructions of the software architecture 606, including implementation of the methods, components, and so forth described herein. The hardware layer 652 also includes memory and/or storage modules as memory/storage 656, which also have the executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive a response as messages 612 in response to the API calls 608. The layers illustrated are representative in nature, and not all software architectures have all layers. For example, some mobile or special-purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than by interfacing directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 6D graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 provide a higher-level common infrastructure that may be used by the applications 616 and/or other software components/modules. For example, the frameworks/middleware 618 may provide various graphic user interface (GUI) functions 642, high-level resource management, high-level location services, and so forth. The frameworks/middleware 618 may provide a broad spectrum of other APIs that may be utilized by the applications 616 and/or other software components/modules, some of which may be specific to a particular operating system or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. The third-party applications 640 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 640 may invoke the API calls 608 provided by the mobile operating system (such as the operating system 602) to facilitate functionality described herein.

The applications 616 may use built-in operating system functions (e.g., kernel 622, services 624, and/or drivers 626), libraries 620, and frameworks/middleware 618 to create user interfaces to interact with users of the system. Alternatively, or additionally, in some systems, interactions with a user may occur through a presentation layer, such as the presentation layer 614. In these systems, the application/component "logic" can be separated from the aspects of the application/component that interact with a user.

Some software architectures use virtual machines. In the example of FIG. 6, this is illustrated by a virtual machine 610. The virtual machine 610 creates a software environment where applications/components can execute as if they were executing on a hardware machine (such as the machine 700 of FIG. 7, for example). The virtual machine 610 is hosted by a host operating system (e.g., the operating system 602 in FIG. 6) and typically, although not always, has a virtual machine monitor 660, which manages the operation of the virtual machine 610 as well as the interface with the host operating system (e.g., the operating system 602). A software architecture executes within the virtual machine 610 such as an operating system (OS) 636, libraries 634, frameworks 632, applications 630, and/or a presentation layer 628. These layers of software architecture executing within the virtual machine 610 can be the same as corresponding layers previously described or may be different.

Figure 7:
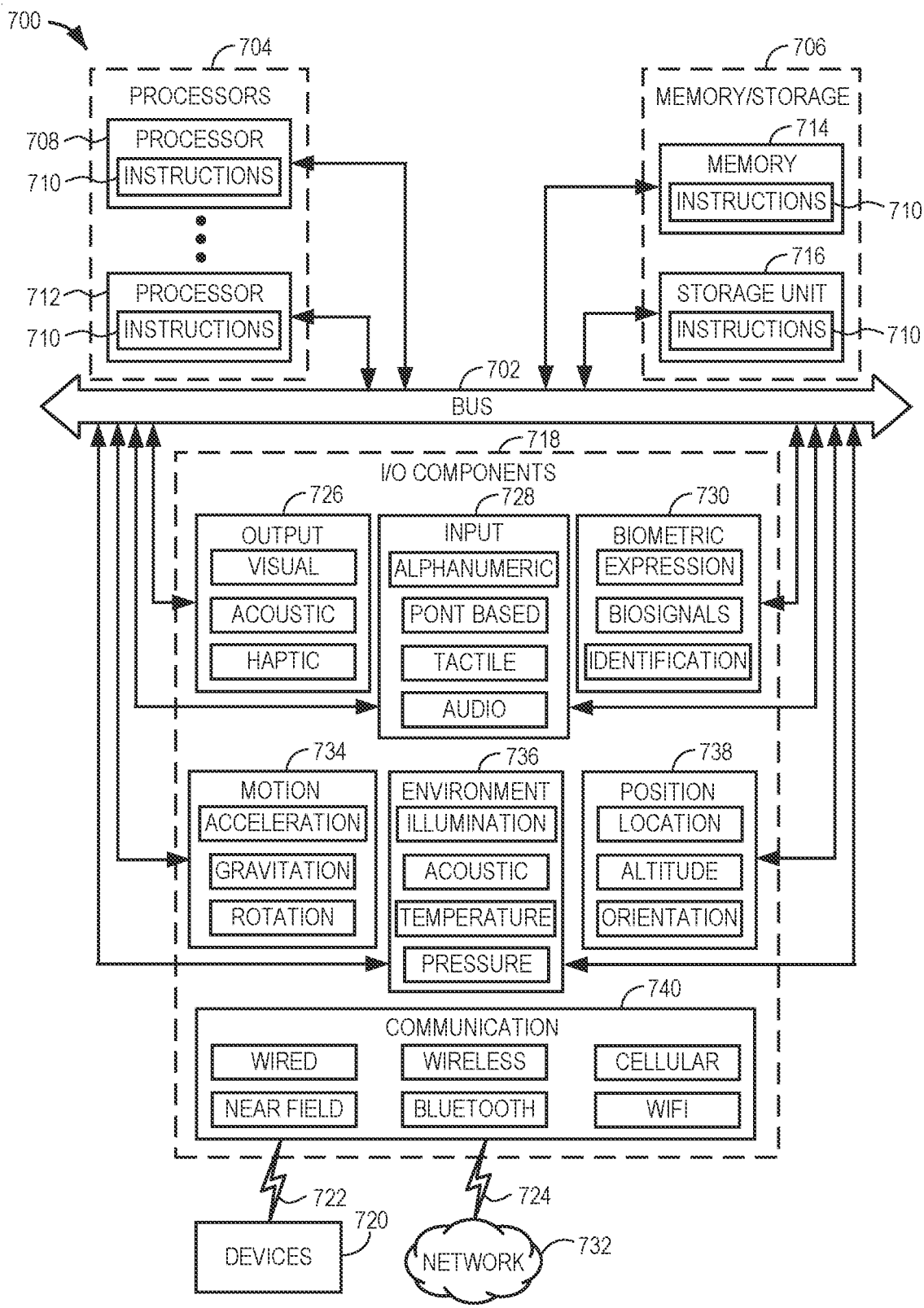
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704 (including processors 708 and 712), memory/storage 706, and I/O components 718, which may be configured to communicate with each other such as via a bus 702. The memory/storage 706 may include a memory 714, such as a main memory or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700.

Accordingly, the memory 714, the storage unit 716, and the memory of the processors 704 are examples of machine-readable media.

The I/O components 718 may include a wide variety of components to receive input, provide output, produce output, transmit information, exchange information, capture measurements, and so on. The specific I/O components 718 that are included in a particular machine will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion, and the grouping is in no way limiting. In various example embodiments, the I/O components 718 may include output components 726 and input components 728. The output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environment components 736, or position components 738, among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 738 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via a coupling 724 and a coupling 722, respectively. For example, the communication components 740 may include a network interface component or other suitable device to interface with the network 732. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 6G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2021, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   at a client instance of a service:
   establishing a rate limit for requests for the service received at the client instance;
   tracking a number of requests for the service received at the client instance during a first time period, while enforcing the rate limit;
   reporting the number of requests for the service received at the client instance during the first time period to a central store, wherein the central store is configured to receive and store reports from a plurality of client instances of the service connected to the service during the first time period;
   making an asynchronous call to the central store for aggregated information regarding a total number of the plurality of client instances of the service connected to the service during the first time period and the number of requests for the service received at all of the plurality of client instances of the service during the first time period;
   adjusting the rate limit based on the total number of the plurality of client instances of the service connected to the service during the first time period and the number of requests for the service received at all of the plurality of client instances of the service during the first time period; and
   modifying the adjusted rate limit based on a prediction from a machine learned model,
   wherein the machine learned model is trained using time of day information to predict a modification based on node type of a node running the service client instance, wherein the node type is a combination of the service and a type of machine running the node.

2. The method of claim 1, wherein the establishing the rate limit includes dividing a capacity of the service by the total number of the plurality of client instances connected to the service.

3. The method of claim 1, wherein the adjusting the rate limit includes subtracting a number of requests for the service received at all of the plurality of client instances of the service during the time period from a total capacity of the service, dividing the difference by the total number of the plurality of client instances of the service connected to the service during the first time period, and adding a result of the dividing to the number of requests for the service received at the client instance during the first time period.

4. The method of claim 1, further comprising repeating the tracking, reporting, making, and adjusting for a second time period equal in length to the first time period.

5. The method of claim 1, wherein the machine learned model is trained using time of day information to predict a modification based on current time of day.

6. A system comprising:
   one or more processors; and
   a memory storing instructions that, when executed by at least one processor among the one or more processors, cause the at least one processor execute a client instance of a service to perform operations comprising:
   establishing a rate limit for requests for the service received at the client instance;
   tracking a number of requests for the service received at the client instance during a first time period, while enforcing the rate limit;
   reporting the number of requests for the service received at the client instance during the first time period to a central store, wherein the central store is configured to receive and store reports from a plurality of client instances of the service connected to the service during the first time period;
   making an asynchronous call to the central store for aggregated information regarding a total number of the plurality of client instances of the service connected to the service during the first time period and the number of requests for the service received at all of the plurality of client instances of the service during the first time period;
   adjusting the rate limit based on the total number of the plurality of client instances of the service connected to the service during the first time period and the number of requests for the service received at all of the plurality of client instances of the service during the first time period; and modifying the adjusted rate limit based on a prediction from a machine learned model, wherein the machine learned model is trained using time of day information to predict a modification based on node type of a node running the service client instance, wherein the node type is a combination of the service and a type of machine running the node.

7. The system of claim 6, wherein the establishing the rate limit includes dividing a capacity of the service by the total number of the plurality of client instances connected to the service.

8. The system of claim 6, wherein the adjusting the rate limit includes subtracting a number of requests for the service received at all of the plurality of client instances of the service during the time period from a total capacity of the service, dividing the difference by the total number of the plurality of client instances of the service connected to the service during the first time period, and adding a result of the dividing to the number of requests for the service received at the client instance during the first time period.

9. The system of claim 6, wherein the instructions further comprise repeating the tracking, reporting, making, and adjusting for a second time period equal in length to the first time period.

10. The system of claim 6, wherein the machine learned model is trained using time of day information to predict a modification based on current time of day.

11. A non-transitory machine-readable medium comprising instructions which, when read by a machine, cause the machine to perform operations comprising:

at a client instance of a service:

establishing a rate limit for requests for the service received at the client instance;

tracking a number of requests for the service received at the client instance during a first time period, while enforcing the rate limit;

reporting the number of requests for the service received at the client instance during the first time period to a central store, wherein the central store is configured to receive and store reports from a plurality of client instances of the service connected to the service during the first time period;

making an asynchronous call to the central store for aggregated information regarding a total number of the plurality of client instances of the service connected to the service during the first time period and the number of requests for the service received at all of the plurality of client instances of the service during the first time period;

adjusting the rate limit based on the total number of the plurality of client instances of the service connected to the service during the first time period and the number of requests for the service received at all of the plurality of client instances of the service during the first time period; and modifying the adjusted rate limit based on a prediction from a machine learned model, wherein the machine learned model is trained using time of day information to predict a modification based on node type of a node running the service client instance, wherein the node type is a combination of the service and a type of machine running the node.

12. The non-transitory machine-readable medium of claim 11, wherein the establishing the rate limit includes dividing a capacity of the service by the total number of the plurality of client instances connected to the service.

13. The non-transitory machine-readable medium of claim 11, wherein the adjusting the rate limit includes subtracting a number of requests for the service received at all of the plurality of client instances of the service during the time period from a total capacity of the service, dividing the difference by the total number of the plurality of client instances of the service connected to the service during the first time period, and adding a result of the dividing to the number of requests for the service received at the client instance during the first time period.

14. The non-transitory machine-readable medium of claim 11, wherein the instructions further comprise repeating the tracking, reporting, making, and adjusting for a second time period equal in length to the first time period.

15. The non-transitory machine-readable medium of claim 11, wherein the machine learned model is trained using time of day information to predict a modification based on current time of day.

* * * * *